United States Patent [19]
Meyer

[11] Patent Number: 5,392,398
[45] Date of Patent: Feb. 21, 1995

[54] SYSTEM AND METHOD FOR DEALLOCATION A FIRST MESSAGE INDEPENDENTLY OF THE DEALLOCATION OF A SECOND MESSAGE IN A BUNDLE OF MESSAGES

[75] Inventor: Christopher Meyer, Vestal, N.Y.

[73] Assignee: International Business Machines Corporation, Armonk, N.Y.

[21] Appl. No.: 871,867

[22] Filed: Apr. 20, 1992

[51] Int. Cl.⁶ .......................................... G06F 13/00
[52] U.S. Cl. ...................................... 395/200; 395/725; 364/230.4; 364/282.2; 364/284.3; 364/DIG. 1; 370/60; 370/94.1
[58] Field of Search ............... 395/200, 250, 425, 600, 395/725; 364/200, 900, 239.5, 239.51, 245.5, 282.2, 284.3; 370/94.1, 60, 85.1

[56] References Cited

U.S. PATENT DOCUMENTS

| | | | |
|---|---|---|---|
| 5,099,418 | 3/1992 | Pian et al. | 395/650 |
| 5,109,485 | 4/1992 | Smith, Jr. | 395/200 |
| 5,121,479 | 6/1992 | O'Brien | 395/250 |
| 5,214,783 | 5/1993 | Lips et al. | 395/725 |
| 5,278,984 | 1/1994 | Batchelor | 395/650 |

FOREIGN PATENT DOCUMENTS 0479660 8/1992 European Pat. Off. .

OTHER PUBLICATIONS

Operating Systems Review (SIGOPS) vol. 22, No. 2, Apr. 1988, New York, US "Single-User Capabilities in Interporocess Communication", S. Russell, pp. 45-52.
Electro/87 Mini/Micro Northeast Conf. Record, vol. 12, 1987, Los Angeles, US "A Hierarchical View of Multibus II Software", R. W. Boberg, pp. 1-7.
5th Annual Int. Phoenix Conf. on Computers & Communications, Mar. 26, 1986, Arizona, US, "A Distributed Kernel for Support of Transparent Communication between Tasks", M. Faci et al., pp. 625-631.

*Primary Examiner*—Robert L. Richardson
*Assistant Examiner*—Moustafa M. Meky
*Attorney, Agent, or Firm*—Pryor A. Garnett; Arthur J. Samodovitz

[57] ABSTRACT

In a cooperative processing system, a client sends bundles of padded messages to a server which receives the messages, processes them and deallocates the storage for each message piecemeal. A storage manager of the server handles integer multiples of some minimum granularity (n) of storage units, and allows storage to be deallocated in amounts smaller than the amount originally allocated. The client packages and bundles each message into an amount of storage equal to an integer multiple of the server storage granularity, before sending the bundle to the server via a communications transport. The server places the bundle into a single buffer, with each message occupying a corresponding portion of the buffer. Each message is then unbundled for processing in place by the server process to which it was sent, after which its portion of storage is immediately deallocated.

17 Claims, 7 Drawing Sheets

COOPERATIVE PROCESSING SYSTEM

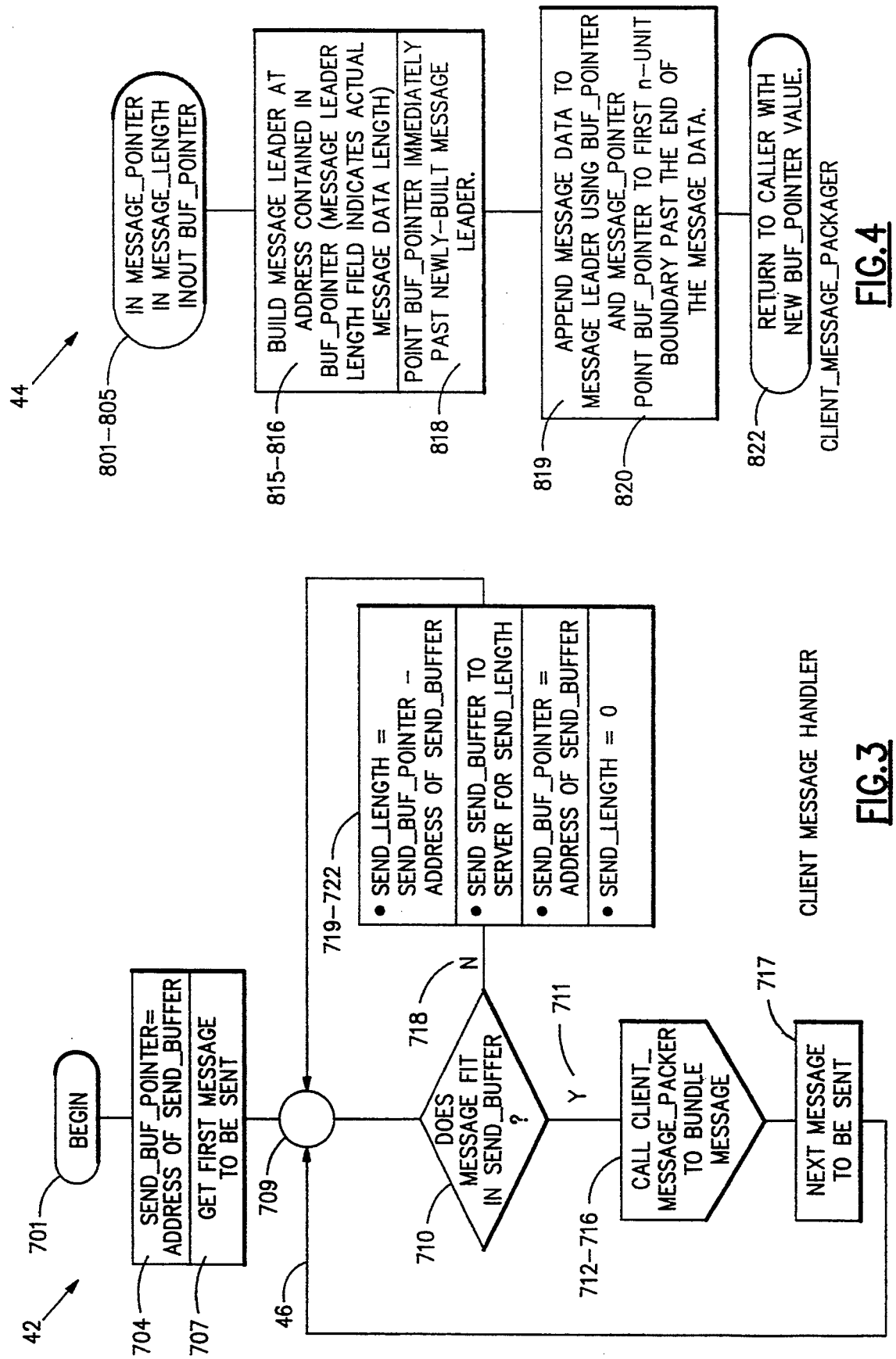

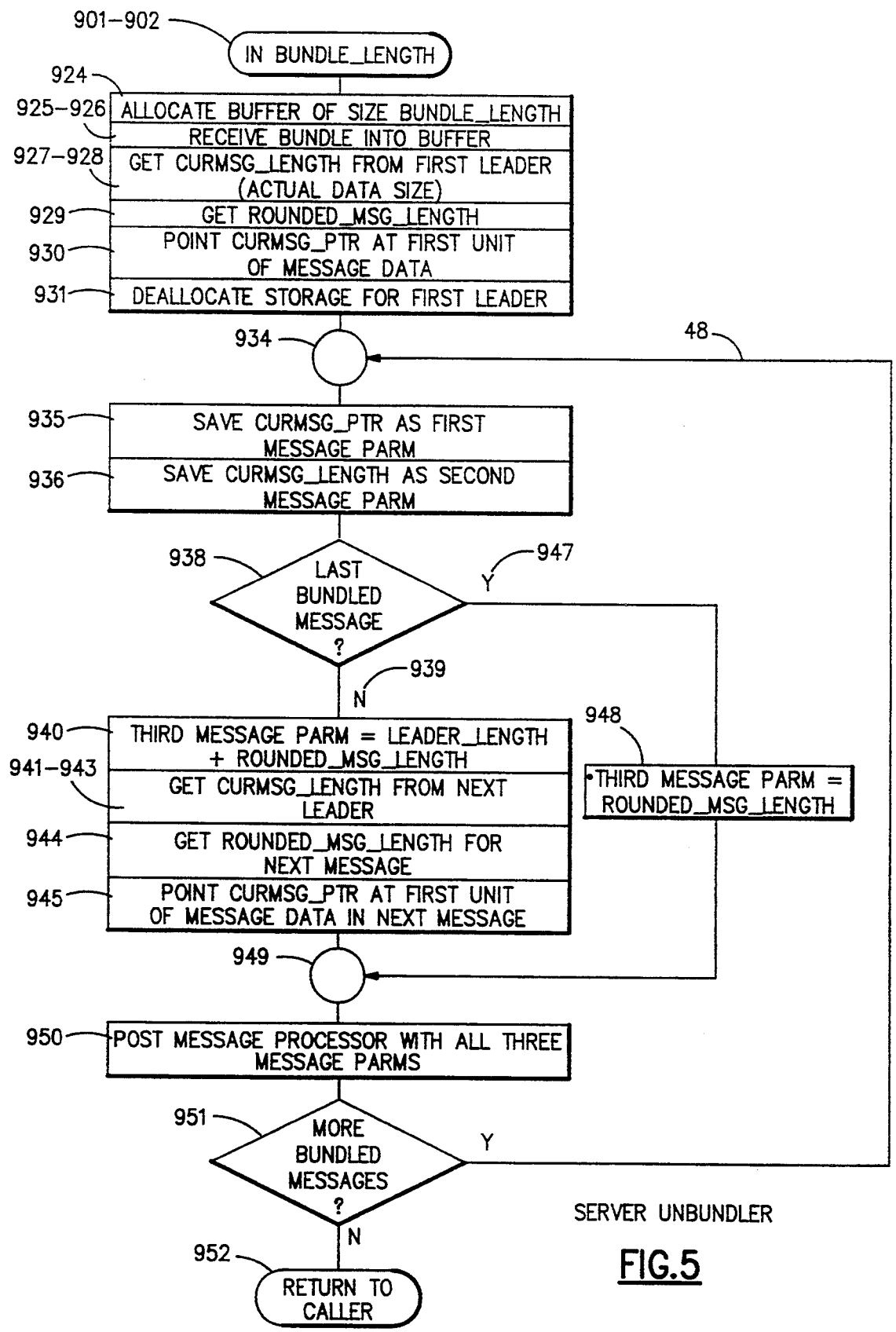

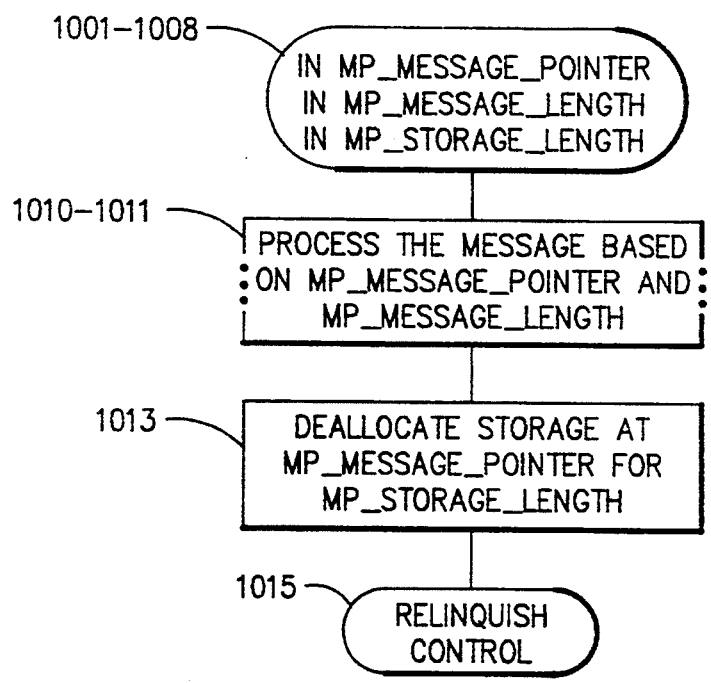

SERVER_MESSAGE_PROCESSOR FLOWCHART

FIG.6

```
701    CLIENT_MESSAGE_HANDLER: PROCEDURE ();
702
703       BUFFER    SEND_BUFFER[FITS AT LEAST ONE MESSAGE]
704       POINTER   SEND_BUF_POINTER = ADDRESSOF(SEND_BUFFER);
705       INTEGER   SEND_LENGTH;
706
707       GET NEXT_MESSAGE TO BE SENT TO SERVER;
708
709       DO FOREVER
710          IF NEXT_MESSAGE WILL FIT IN SEND_BUFFER
711          THEN
712             CALL CLIENT_MESSAGE_PACKER
713                ( IN ADDRESSOF(NEXT_MESSAGE),
714                  IN SIZEOF(NEXT_MESSAGE),
715                  INOUT SEND_BUF_POINTER
716                );
717             GET NEXT_MESSAGE TO BE SENT TO SERVER;
718          ELSE
719             SEND_LENGTH = SEND_BUF_POINTER - SEND_BUFFER;
720             SEND TO SERVER FROM SEND_BUFFER FOR SEND_LENGTH;
721             SEND_BUF_POINTER = ADDRESSOF(SEND_BUFFER);
722             SEND_LENGTH = 0;
723          ENDIF
724       END DO FOREVER
725
726    END CLIENT_MESSAGE_HANDLER;
```

CLIENT MESSAGE HANDLER PROCEDURE

FIG.7

```
801   CLIENT_MESSAGE_PACKAGER: PROCEDURE
802     (  IN MESSAGE_POINTER,        /* ADDRESS OF MESSAGE TO SEND  */
803        IN MESSAGE_LENGTH,         /* UNIT SIZE OF MESSAGE DATA   */
804        INOUT BUF_POINTER          /* ADDRESS OF BUFFER INTO WHICH*/
805     );                            /* PADDED MESSAGE IS PLACED    */
806
807   DEFINE n = [SERVER STORAGE MANAGER'S BOUNDARY SIZE]
808
809   MAPPING MESSAGE_LEADER
810   {
811       INTEGER LENGTH
812       FILLER PAD_A[n - SIZEOF(MESSAGE_LEADER.LENGTH)]
813   }
814
815   OVERLAY MESSAGE_LEADER ON BUF_POINTER;
816   MESSAGE_LEADER. LENGTH = MESSAGE_LENGTH + SIZEOF(MESSAGE_LEADER);
817
818   BUF_POINTER = BUF_POINTER + SIZEOF(MESSAGE_LEADER);
819   COPY FROM MESSAGE_POINTER TO BUF_POINTER FOR MESSAGE_LENGTH;
820   BUF_POINTER = BUF_POINTER + ( ((MESSAGE_LENGTH + (n-1)) / n ) * n);
821
822   END CLIENT_MESSAGE_PACKAGER;
```

CLIENT MESSAGE PACKAGER PROCEDURE

FIG.8

```
934   DO UNTIL TOTAL_LENGTH = BUNDLE_LENGTH;
935         MP_MESSAGE_POINTER = CURMSG_PTR;
936         MP_MESSAGE_LENGTH = CURMSG_LENGTH;
937         TOTAL_LENGTH = TOTAL LENGTH + ROUNDED_MSG_LENGTH;
938         IF TOTAL_LENGTH < BUNDLE_LENGTH
939         THEN
940           MP_STORAGE_LENGTH = ROUNDED_MSG_LENGTH +
                 SIZEOF(MESSAGE_LEADER);
941           CURMSG_PTR = CURMSG_PTR + ROUNDED_MSG_LENGTH;
942           OVERLAY MESSAGE_LEADER ON CURMSG_PTR;
943           CURMSG_LENGTH = MESSAGE_LEADER. LENGTH -
                 SIZEOF(MESSAGE_LEADER);
944           ROUNDED_MSG_LENGTH = ((CURMSG_LENGTH + (n-1)) / n ) * n;
945           CURMSG_PTR = CURMSG_PTR + SIZEOF(MESSAGE_LEADER);
946           TOTAL_LENGTH = TOTAL_LENGTH + SIZEOF(MESSAGE_LEADER);
947         ELSE
948           MP_STORAGE_LENGTH = ROUNDED_MSG_LENGTH;
949         ENDIF
950         POST SERVER_MESSAGE_PROCESSOR WITH MESSAGE_PARAMETERS;
951   END DO UNTIL
952   END UNBUNDLER;
```

SERVER UNBUNDLER PROCEDURE - PART B

FIG.9B

```
901  UNBUNDLER: PROCEDURE
902        (  IN BUNDLE_LENGTH            );
903
904     DEFINE    n = [SERVER STORAGE MANAGER'S BOUNDARY SIZE]
905     POINTER   BUNDLE_POINTER;      /* ADDRESS OF BUNDLED BUFFER    */
906     POINTER   CURMSG_PTR;          /* ADDRESS OF CURRENT MESSAGE   */
907     INTEGER   CURMSG_LENGTH;       /* ACTUAL LENGTH OF CURRENT     */
                                       /* MESSAGE                      */
908     INTEGER   ROUNDED_MSG_LENGTH;  /* ROUNDED LENGTH OF CURRENT    */
                                       /* MESSAGE                      */
909     INTEGER   TOTAL_LENGTH;        /* ACCUMULATES AMOUNT OF BUFFER */
910                                    /* THAT WE HAVE ACCOUNTED FOR.  */
911     MAPPING MESSAGE_LEADER
912     {
913         INTEGER   LENGTH
914         FILLER    PAD_A[n - SIZEOF(MESSAGE_LEADER. LENGTH)]
915     }
916
917     STRUCTURE   MESSAGE_PARAMETERS
918     {
919         POINTR    MP_MESSAGE_POINTER
920         INTEGER   MP_MESSAGE_LENGTH
921         INTEGER   MP_STORAGE_LENGTH
922     }
923
924     ALLOCATE STORAGE FOR BUNDLE_LENGTH;
925     BUNDLE_POINTER = ADDRESSOF(ALLOCATED BUFFER);
926     RECEIVE FROM CLIENT TO BUNDLE_POINTER FOR BUNDLE_LENGTH;
927     OVERLAY MESSAGE_LEADER ON BUNDLE_POINTER;
928     CURMSG_LENGTH = MESSAGE_LEADER. LENGTH - SIZEOF(MESSAGE_LEADER);
929     ROUNDED_MSG_LENGTH = ((CURMSG_LENGTH + (n-1)) / n) * n;
930     CURMSG_PTR = BUNDLE_POINTER + SIZEOF(MESSAGE_LEADER);
931     DEALLOCATE STORAGE AT BUNDLE_POINTER FOR SIZEOF(MESSAGE_LEADER);
932     TOTAL_LENGTH = SIZEOF(MESSAGE_LEADER);
933            SERVER UNBUNDLER PROCEDURE - PART A
```

FIG.9A

```
1001  SERVER_MESSAGE_PROCESSOR: PROC (IN MESSAGE_PARAMETERS)
1002
1003     STRUCTURE   MESSAGE_PARAMETERS
1004     {
1005         POINTR    MP_MESSAGE_POINTER
1006         INTEGER   MP_MESSAGE_LENGTH
1007         INTEGER   MP_STORAGE_LENGTH
1008     }
1009
1010     PROCESS THE MESSAGE:   MESSAGE ADDRESS IS MP_MESSAGE_POINTER,
1011                            MESSAGE LENGTH IS MP_MESSAGE_LENGTH.
1012
1013     DEALLOCATE STORAGE AT MP_MESSAGE_POINTER FOR MP_STORAGE_LENGTH;
1014
1015  END SERVER_MESSAGE_PROCESSOR;
```

FIG.10

SYSTEM AND METHOD FOR DEALLOCATION A FIRST MESSAGE INDEPENDENTLY OF THE DEALLOCATION OF A SECOND MESSAGE IN A BUNDLE OF MESSAGES

BACKGROUND OF THE INVENTION

1. Technical Field

This invention relates to the handling of communications between 'client' and 'server' computer processes. In particular, this invention reduces data movement operations at the server process, thereby minimizing the overhead associated with communications between the two processes.

2. Description of the Prior Art

Many applications exist in which two processes must pass messages back and forth over some type of communication transport. Such applications are called 'cooperative applications' and the processing done by them is called 'cooperative processing.' Often, the two processes involved are performed on different computers. Moving data between computers and between processes can cause a large amount of computing overhead. Also, depending on the application or operating environment, once the data is received by the 'server' process, more overhead can be incurred by moving the data to different locations in the server's local storage. Since all of this overhead greatly reduces the performance of such an application, an important objective of cooperative processing is to minimize the movement of data between the processes and within each process.

In order to reduce the overhead associated with interprocess communications, some communication facilities bundle multiple small messages into a single, larger buffer. While this can reduce the amount of work for the communication facility, arbitrarily combining variable length messages into a single buffer can actually cause problems for the server in terms of managing its storage space. Many operating environments use a scheme where storage is allocated to applications only in even multiples of some predetermined number of units. For instance, in a storage manager which allocates storage in multiples of 8 units, an application's request for five units of storage would actually return 8 units to the application. In such an environment, when a set of bundled variable length messages is placed in storage, the beginning and ending boundaries of the messages will probably not coincide with the minimum storage unit size of the storage manager. If the entire set of messages is received into a contiguous buffer of storage, every message buffer must be processed before the block can be returned to the operating environment since attempting to free each message as it is processed would cause the corruption of portions of messages that fall between the end of one message and the next storage unit boundary of the buffer. Processing all buffers in the block before returning the block to the operating environment can constrain the system's storage if the number or size of the messages is large.

To avoid constraining storage, each small message would have to be received individually (assuming this capability exists) into a buffer tailored to the size of the message. In this case excessive overhead is incurred not only by the invocation of multiple receive operations to put each message into the local buffer, but also by the extra storage manager calls to allocate multiple buffers.

None of the above prior art message bundling schemes provide satisfactory performance in cooperative processing. There is a need for a way to capitalize on oportunities for message bundling while providing satisfactory storage-related performance.

SUMMARY OF THE INVENTION

A first embodiment of this invention is a computerized data processing system including a client and a server. The server can deallocates its storage only in integer multiples of some granularity n. The client sends messages to the server for processing there, first padding the messages to respective integer multiples of n, and then bundling the padded messages into a bundle which is sent a a single unit. The server receives the bundle, determines for each message a corresponding portion of storage which is again an integer multiple of n, and processes the messages. The server deallocates the portion of storage corresponding to a first one of the messages independently of its deallocation of the portion of storage corresponding to the second message.

A second embodiment of the invention is a method for communicating between a first computer system and a second computer system, the second system having a storage deallocation granularity n. The first computer prepares first and second messages, pads them to respective integer multiples of n, bundles the padded messages, and sends the bundle to the second system. The second computer receives the bundle from the first system and stores the bundle in a single buffer with each message in a portion of storage which is an integer multiple of n. In processing the messages, the server deallocates the portion of storage corresponding to the first message before deallocating the portion of storage corresponding to the second message.

By packaging each message at the client in a manner that will conform to the rules enforced by the server's storage manager, multiple messages can be bundled by the communication transport, the client, or even both, such that an entire bundle of messages can be moved from the communication transport into one large buffer in the server's storage area by a single 'receive data' operation. Once received, each message is 'unbundled' and is then processed in place in any order. After a message is processed, the storage that it occupies as well as any 'padding space' added by the client are immediately returned to the storage manager for reuse.

Other features and advantages of this invention will become apparent from the following detailed description of the presently preferred embodiment of the invention, taken in conjunction with the accompanying drawings.

BRIEF DESCRIPTION OF THE DRAWINGS

FIG. 3 is a flowchart of the processing performed by the client of FIG. 1.

FIG. 4 is a flowchart of the method for bundling messages of FIG. 3.

FIG. 5 is a flowchart of the method of receiving and unbundling messages by the server of FIG. 1.

FIG. 6 is a flowchart of the method for processing messages by the server of FIG. 1.

FIGS. 7-8, 9A-9B, and 10 are pseudocode implementations corresponding to the flowcharts of FIGS. 3-6, respectively.

DESCRIPTION OF THE PREFERRED EMBODIMENT

Overview

Figure 1:
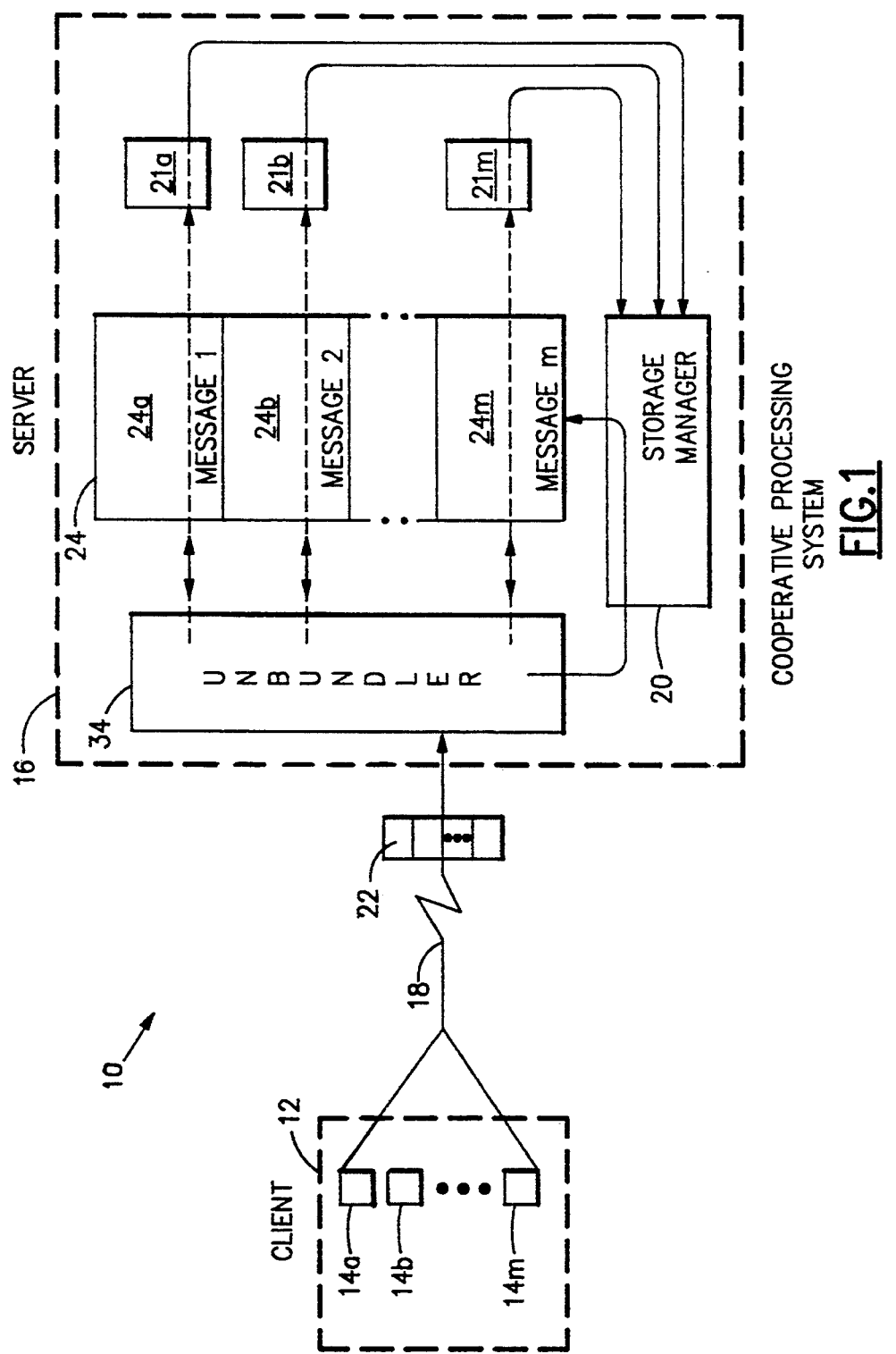
FIG. 1 is a block diagram of a computerized data processing system for communicating multiple, bundled messages between client and server computer processes according to the presently preferred embodiment of this invention.

As shown in FIG. 1, the cooperative processing system 10 of this invention includes a client 12 that sends messages 14a,14b, . . . ,14m (collectively 14) in a bundle 22 to a server 16 which receives the messages and processes them. The client's messages are sent over a communication transport 18 which supports a communications protocol (e.g., APPC, TCP, UDP, NetBIOS, etc.) between the client and the server. The server 16 includes a storage manager 20 and one or more server processes 21a,21b, . . . ,21m (collectively 21). The storage manager 20 manages storage in even multiples of some minimum number (n) of storage units, and that allows a block of storage to be returned to the manager through multiple deallocation requests for amounts of storage that are smaller than the amount originally allocated. The server processes 21 perform data processing tasks using the data in their respective messages 14 from the client. The interaction between the client and the server processes comprise cooperative processing.

The client 12 packages each message 14 in a manner that will conform to the rules enforced by the storage manager 20 of the server 16. The communications transport 18 transmits the bundle 22 of messages from the client 12 such that the server can move an entire bundle of messages from the communication transport 18 into one large buffer 24 in the server's storage area by a single 'receive data' operation, with each message 14 occupying a corresponding portion 24a,24b, . . . 24m of the buffer 24. Once received, each message 14 is unbundled for processing in place by the server process to which it was sent. After each message is processed, the storage 24a,24b,24m that it occupies including any padding space added by the client 12 are immediately deallocated (returned) to the storage manager 20 for reuse.

An important technique used herein is 'padding,' which is the act of filling in extra space between the end of one field and the beginning of the next. To determine padding lengths, 'rounding up' is used to compute the smallest even multiple of a given integer m that is greater than some value x. A common formula for rounding up is:

rounded value=((x+(m−1))/m)*m, and this formula is referred to several times in the description that follows.

Message Packaging and Bundled Buffers

Figure 2:
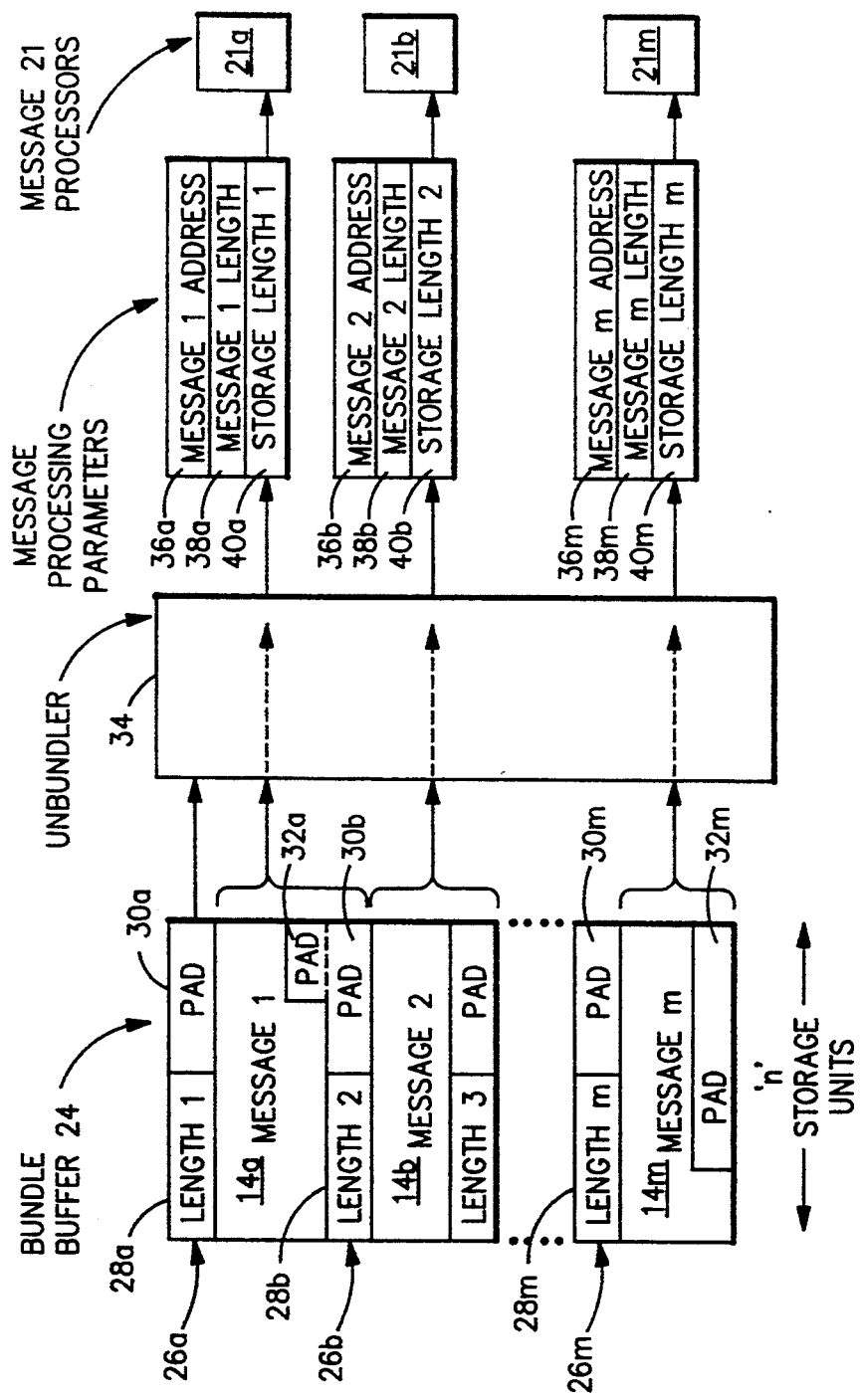
FIG. 2 is a block diagram of the bundle of messages shown in FIG. 1.

FIG. 2 shows how messages are formatted and how several such messages appear once they have been bundled.

A buffer 24 containing the bundle of messages is shown on the lefthand side of FIG. 2. Each message 14 is preceded by a leader 26a,26b, . . . ,26m (collectively 26) which consists of a length field 28a,28b, . . . ,28m (collectively 28) followed by enough padding space 30a,30b, . . . ,30m (collectively 30) to bring the length of the leader to an even multiple of the minimum number n of storage units handled by the storage manager 20. Preferably the leader for every message sent to a given server 16 is the same size. At the end of each message 14, tail padding space 32a, . . . ,32m (collectively 32) is added to bring the resulting length of that message's storage 24a,24b,24m in the buffer 24 to an even multiple of n. However if the length of the message data 14 is an even multiple of n, then no tail padding space 32 is appended to the end of the message, as shown by the second message 14b.

The length field 28 for each message 14 contains length information that the respective server process 21 can use to determine the length of the actual message data 14. This might be the length of the message data alone, but is preferably the length of the leader 26 plus the length of the unpadded message data 14. Since the leader 26 is a fixed size, this length field 28 allows the server process to determine the exact amount of message data 14 sent to it by the client 12.

By adding the leader 26 and tail padding space 32, the length of each padded message 24a,24b,24m is guaranteed to be an even multiple of n. Further, if several padded messages 24a,24b,24m are combined into a single large buffer 24, it is guaranteed that as long as the first character of the first padded message 24a in the bundle is located on an n-unit boundary, all other padded messages 24b,24m in the buffer 24 will also begin and end on n-unit boundaries. This permits the portions 24a,24b,24m of the buffer to be deallocated piecemeal, as described in the following section.

Unbundling and Deallocating Buffer Storage

At the server, each message is extracted from the buffer for processing by the server processes to which it was addressed, after which the portion of storage containing that message is returned using a minimal number of deallocation calls. When the server 16 receives a bundle of messages into buffer 24 in its storage area, an unbundler process 34 ( FIG. 1 ) picks each padded message 24a, 24b, 24m out of the bundle and notifies the respective server process 21 of the existence of a message to be processed.

The righthand side of FIG. 2 illustrates how each padded message 24a,24b,24m is logically broken out of the bundle buffer 24. The unbundler process 34 passes three parameters to each of the server processes 21 receiving messages 14. These parameters ensure that the message data 14a,14b,14m can be located and that the storage 24a,24b,24m occupied by the message can be returned to the storage manager 20. The first parameter 36a,36b, . . . ,36m (collectively 36) is the starting address of the message data 14. The second parameter 38a,38b, . . . ,38m (collectively 38) is the length of that data (i.e., the number of storage units occupied by the unpadded message data). The third parameter 40a,40b, . . . ,40m (collectively 40) is the length of (alternatively, the number of storage units in) the portion of storage 24a,24b,24m to be deallocated when the message data has been processed. Preferably this third parameter 40 specifies the length of the padded message data plus the length of the message leader 26 of the subsequent message, if any, in the buffer 24.

Passing both the length 38 of the message data 14 and the length 40 of the storage to be deallocated provides the server processes 21 the information they need to deallocate not only the storage occupied by the message data 14, but also any padding space 32 at the end of the message as well as the leader 26 for the next padded message in the buffer 24. The storage length parameter 40m for the last message 14m in bundle buffer 24 will contain only the length 38 of the message 14m plus any tail padding 32m. Being the last padded message 24m in the bundle buffer, there is no subsequent message leader to be deallocated.

Deallocation of the first leader 26a in the bundle buffer 24 is the responsibility of the unbundler process 34. In the preferred embodiment the first leader 26a is deallocated explicitly by the unbundler process 34. In alternative emdodiments where the communication transport 18 supports buffer lists, the server 16 allocates a separate, reusable discontiguous buffer to receive the first leader 26a for bundle buffer 24, avoiding an additional deallocation request for the bundle buffer.

Client Packaging and Bundling Logic

Messages 14 are packaged by the client 12 with leaders 26 and tail padding 32 into the send buffer to be sent to the server 16 via the communication transport 18. The actual bundling of messages 14 into the send buffer is preferably done by the client 12, although it can be handled in part or entirely by the communication transport 18 as well. The flowchart of FIG. 3 and corresponding pseudocode of FIG. 7 show how a client message handler procedure 42 can use multiple calls to a client message packing procedure 44 to build the send buffer.

Before messages 14 can be bundled into the send buffer the client 12 must know the value of n on which the server's storage manager operates. This value can either be a constant known by the client 12, or it can be passed from the server 16 to the client during initialization of the comunication transport. Once n is known by the client 12 it can package and bundle messages for the server.

The client message handler procedure 42 must be able to obtain each new message 14 that is destined for the server 16, package the message and bundle it with others into the send buffer, and then send that bundle 22 over the communication transport 18 to the server. The message handler 42 consists of a loop 46 (lines 709-724) that obtains the next message to be sent to the server (lines 707 and 717), makes sure that the new message will fit in the remaining space in the send buffer (line 710) and calls the client message packager 44 if sufficient space is available (712-716).

If the send buffer does not have sufficient space to fit the new message (718), then the message handler sends the contents of the send buffer to the server (719-720), reinitializes the send buffer (lines 721-722), and loops 46 (line 709) to process the message that previously would not fit in the send buffer. The message handler 42 continues forever until terminated by some event external to it, such as a command entered by a user or the termination of the process which called it.

The client message packager procedure 44 is shown in the flowchart of FIG. 4 and corresponding pseudocode of FIG. 8. Input parameters to the packager 44 (lines 802-804 of FIG. 8) provide the information needed to add the appropriate leader 26 and tail padding 32 and to pack the padded message into the send buffer. First the structure of the message leader 26 and the leader's length is determined (lines 809-813), and the leader 26 is built in the send buffffer (815-816). The OVERLAY operation simply projects the structure of the message leader 26 onto the storage addressed by the buf_pointer (which points to the address in the buffer where the message is to be placed). Then the actual message data 14 is copied into the buffer (lines 818-819).

Finally, any necessary tail padding 32 is added (line 820) at the end of the message to force the next n-unit boundary, using the padding formula described above.

Server Unbundler

The server unbundler procedure 34 receives the bundle, extracts each message 14, and passes each message on to be processed by its respective server process 21, as shown in the flowchart of FIG. 5 and corresponding pseudocode of FIG. 9. Preferably the unbundler procedure 34 is executed by two separately dispatched processes—one which receives the bundle 22 from the communications transport 18 into the storage buffer 24, and another which passes the three message parameters 36,38,40 to their respective server processes 21.

The only input parameter to the unbundler 34 is the length of the buffer 24 to be unbundled (line 902). This would normally be the same as the length of the bundle 22, and would supplied through some type of notification from the communication transport 18. Other variables and parameters needed to unbundle the buffer and pass each message to a server process 21 include the server storage manager's boundary size n, the address of the bundle buffer 24, the address 36 of the message currently being unbundled, the raw (unrounded) length of the current message's data, the rounded length 38 of that data, and the total length of the amount of the buffer currently processed.

The first step is to allocate the contiguous bundle buffer 24 and receive the bundle 22 from the communications transport 18 into that bundle buffer (lines 924-926). Since the storage manager 20 allocates storage in even multiples of n units, the amount of storage allocated for the bundle buffer 24 is actually rounded up (see formula above) to the next n-unit boundary. Next the message length 28a is extracted from the first leader 26a (927-929), the storage containing that leader is deallocated (930-931), and the amount of the bundle buffer 24 processed so far is set to the length of the first leader 26a (932). As in the message packager procedure 44, the OVERLAY operation (927) simply projects the structure of the message leader 26a onto the portion of storage 24a pointed to by bundle pointer, allowing the first leader 26a to be processed in place without requiring data movement of that leader within the server.

A loop 48 (lines 934-951) then repetitvely processes each message within the bundled buffer until none are left. For each message, the unbundler 34 extracts the starting address 36 of the message data and the length 38 of that data as described above, for use as input parameters by the server process 21. The last bundled message is detected by comparing (938) the amount of data that has been processed so far against the total amount of data that was received in the bundle buffer 24. For every bundled message except the last, the amount 40 of storage to be deallocated is calculated as the length 28 of the message data plus the tail padding 32 at the end of the message plus the next message leader 26 (939-946). For the last message in the bundle buffer, the amount 40 of storage to be deallocated is equal to the length 28 of the message data plus the tail padding 32 (947-948). When the values of the message processor parameters have been established (949) the unbundler posts the three parameters 36,38,40 to the server process (950) so that the message can be processed and the storage can be deallocated. When the end of the bundle buffer 40 is reached, all messages 14 have been posted to server processes 21 and all storage in the buffer 24 has been accounted for. Having nothing more to do, the unbundler procedure 34 returns control to the process which called it.

Server Message Processor 21

The server message process 21 uses the information passed by the unbundler 34 to process its message 14 and then deallocate the associated buffer storage. The flowchart of FIG. 6 and the corresponding pseudocode of FIG. 10 show this procedure.

The message processor 21 uses the message address 36 and the length 38 of the message data passed by the client (lines 1001–1008) to process the message (1010–1011). The actual processing of the message would depend on the task being performed by the cooperative application, and is not relevant to the message handling of this invention. Once the message is processed the message processor 21 calls the storage manager 20 to release the message's storage (1013), deallocating not only the storage occupied by the message data 14, but also the tail padding space 32 as well as the message leader 26 for the next message in the bundle buffer, if such a message existed.

Advantages over the Prior Art

Exploiting and promoting the bundling of messages reduces the number of communication requests (e.g., 'receive data' and 'send data' operations) that are required of the communications transport. Such communication requests are usually very expensive in terms of computing overhead and I/O (input/output) time, and result in much slower response time. Reducing communication requests therefore improves the performance of the cooperative application.

Additionally, having the server process messages in place (instead of copying each message once it has been received) minimizes data movement and 'deallocate storage' requests performed within the server. When the volume of messages is large the improvement in the server's response time is marked.

Further, allowing the storage for each message to be returned as each message is processed helps avoid storage constraints at the server, again increases the server's responsiveness to the client and improving the performance of the cooperative application.

Alternative Embodiments

It will be appreciated that, although specific embodiments of the invention have been described herein for purposes of illustration, various modifications may be made without departing from the spirit and scope of the invention. In particular, the value of n used by the server's storage manger may either be coded as a constant at the client or it may be passed to the client from the server during initialization of the communications transport.

The unit size of the actual message data may also be contained within the message itself, or in a message descriptor following the message, instead of in a separate message leader preceding the message. In the former case there may be no need to compute the message length in the unbundler—only the storage length to be deallocated would need to be computed and passed to the message processor.

As noted earlier, bundling may be performed by the client, by the communication transport at the client end or at the server end, or in some cooperative manner by both. Further, the padding of the individual messages could be performed by the communication transport at either the client end or at the server end, instead of by the client as described above.

The method used to prefix the message leader to the message data at the client will ideally minimize the amount of data movement within the client, and alternatives to the method described above may be used with the message bundling of this invention.

Again as noted earlier, where the communication protocol supports buffer lists the space for the first message leader from each bundle of messages can be permanently allocated at the server and reused for each bundle, saving one storage deallocation request for every bundle received.

Where the communication protocol requires a length field to prefix each packet of user data, that prefix area may substitute for the message data length field described above. An example of such a protocol is APPC, which uses a 2 byte length prefix for each logical record that is passed over an APPC conversation. In this case, the APPC length field would simply include all of the padding space as part of the logical record. However to use this alternative the message data may need contain the exact length of the message since the tail padding space at the end of the message will be accounted for in the message leader length field.

The tail padding operation used to force the necessary n-unit boundaries may require filling the intervening space with some special character to indicate that the space is not 'real' data.

Deallocation of subsequent messages' portions of storage is usually done after deallocation of previous messages' storage, but that is not necessarily the case. This invention permits the deallocation of the portions of storage to be done independently of each other—in any order.

Finally, while the invention has been described in terms of messages being sent from a client computer to a server computer, it will be understood that the optimized buffer handling of this invention is useful in any cooperative processing arrangement between two or more computer systems. In fact, the invention is useful between processes running in a single computer and exchanging messages between themselves.

A first complementary embodiment of this invention comprises a data processing system including general purpose digital computers programmed to act as client and as server according to the method of the invention. For example, the server could be a model 3090 (tm) or 9021 (tm) mainframe computer of running the VM/ESA (tm) operating system while the client could be a PS/2 (tm) personal computer of IBM running the OS/2 (tm) operating system. The preceeding trademarks are all owned by the International Business Machines Corporation (IBM). Suitable digital computers and operating systems are well known articles of commerce, and are not described further.

A second complementary embodiment comprises an article of manufacture for distributing computer programs for performing the method of this invention. Such programs might be distributed as discrete programs for the server and the client, as a single product with components for the server and client, or as embedded features of the server's and client's operating systems or applications. Such an article embodying this invention comprises a recording medium upon which are recorded the computer instructions for performing the steps of the method of the invention. The medium is preferably a magnetic tape such as the model 3480 tape cartridge of IBM, or a removable magnetic disk such as a 3½ inch diskette for use in a PS/2 personal computer. The instructions are recorded on the medium by conventional bulk-recording techniques and devices which are well known in the art, and which are not described further.

Accordingly, the scope of protection of this invention is limited only by the following claims and their equivalents.

I claim:

1. In a computerized data processing system including a client system, a server system having a storage deallocation granularity, and means for sending messages in bundles from the client system to the server system, the improvement comprising:
   means for padding a first message to an integer multiple of said granularity and padding a second message to an integer multiple of said granularity before sending the messages to the server system;
   means for bundling the first and second padded messages together and supplying the bundle to the means for sending so that the bundle is sent to the server system;
   means, at the server system for storing the bundle in allocated storage; and
   means for deallocating said storage in portions which are integer multiples of said granularity such that a portion of said storage containing said first message is deallocated separately from another portion of said storage containing said second message.

2. The improvement of claim 1, wherein the client and server systems comprise physically distinct computers and wherein the means for sending comprises a physical communication transport.

3. The improvement of claim 1, wherein the client system includes the means for padding.

4. The improvement of claim 1, wherein the client system includes the means for bundling.

5. The improvement of claim 4, wherein the bundle includes for each message a message descriptor and the padded message.

6. The improvement of claim 5, wherein the portion of storage corresponding to each of the messages includes the padded message, plus a message descriptor for a next message in the bundle.

7. A computerized data processing system comprising:
   a client computer including
      means for preparing at least first and second messages,
      means for padding the messages to respective integer multiples of a storage granularity,
      means for bundling the padded messages together into a bundle; and
      means for sending the bundle; and
   a server computer including
      means for storing the bundle in allocated storage,
      means for processing the first message before the second message,
      means for determining for the first and second messages respective portions of said storage corresponding to said messages, said portions of storage being integer multiples of the storage granularity, and
      means for deallocating the portion of storage corresponding to the first message before deallocating the portion of storage corresponding to the second message.

8. The system of claim 7, wherein the bundle includes for each of the messages a message descriptor and the padded message.

9. The system of claim 8, wherein each message descriptor is a message leader preceding its respective message and is an integer multiple of the storage granularity.

10. The system of claim 9, wherein the portion of storage corresponding to each message comprises the padded message, plus a message leader for a following message, if any, in the bundle.

11. The system of claim 7, wherein the means for deallocating is included in a storage manager of the server computer, and wherein the storage manager further includes means for allocating the portions of storage.

12. A method for communicating between a first computerized data processing system and a second computerized data processing system, the second system having a storage deallocation granularity, said method comprising the steps performed by the first system of:
   preparing first and second messages;
   padding each of the messages to an integer multiple of the storage deallocation granularity;
   bundling the padded messages together; and
   sending the bundle to the second system;
said method further comprising the steps performed by the second system of:
   receiving the bundle from the first system;
   contiguously storing the bundle, each message having a corresponding portion of storage which is an integer multiple of the storage deallocation granularity;
   processing the first message and the second message; and
   deallocating the portion of storage corresponding to the first message independently of deallocation of the portion of storage corresponding to the second message.

13. The method of claim 12, wherein the step of bundling comprises the step of adding a message descriptor between the messages.

14. The method of claim 13, wherein the step of bundling comprises the step of adding a message leader preceding each message.

15. The method of claim 12, wherein the messages are processed in place in their respective portions of storage.

16. The method of claim 15, wherein the step of deallocating the portion of storage corresponding to the first message is performed in response to the completion of processing of said message.

17. The method of claim 12, wherein the first system is a client workstation computer and the second system is a server host computer.

* * * * *